United States Patent Office 3,642,824
Patented Feb. 15, 1972

---

3,642,824
N,N',N''-TRICHLOROSUCCINIMIDINE
Clifford L. Coon, Fremont, Calif., assignor to Stanford
Research Institute, Menlo Park, Calif.
No Drawing. Filed Dec. 22, 1969, Ser. No. 887,385
Int. Cl. C07d 27/04
U.S. Cl. 260—326.85    1 Claim

ABSTRACT OF THE DISCLOSURE

N,N',N''-trichlorosuccinimidine is prepared by the reaction of succinamidine with an excess of hypochlorite under acid conditions, said compound having a high content of available chlorine and being useful as a chlorinating agent, bleach and disinfectant.

---

It has been discovered that the novel compound N,N', N''-trichlorosuccinimidine can be prepared by reacting succinamidine with an excess of a hypochlorite compound in an aqueous medium under acid conditions, the reaction proceeding rapidly at room temperatures with the formation of the desired chlorinated product. This succinimidine reactant is conveniently formed by dissolving succinamidine in water, and this reaction, together with that which occurs when the succinimidine is chlorinated by the process of the present invention, can be illustrated as follows:

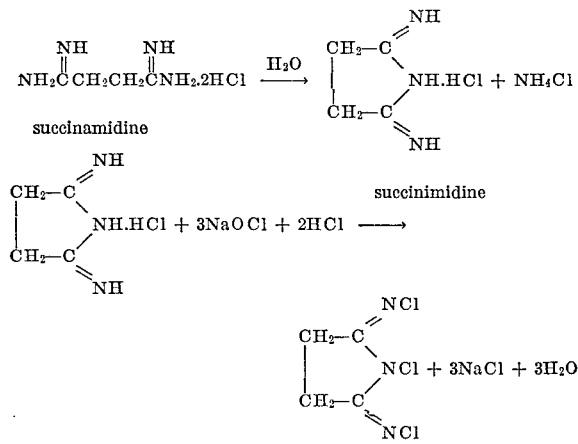

N,N',N''-trichlorosuccinimidine is a white crystalline solid having a melting point of 211–212° C. which is substantially insoluble in water and of good solubility in chloroform, acetone, benzene and other organic solvents. It has a high content of available chlorine and is useful as a chlorinating agent, bleach and disinfectant.

The hypochlorite reactant can be added in the form of a sodium, potassium or other alkali metal hypochlorite salt. This reactant is employed in excess over the amount stoichiometrically required to replace all the nitrogen-attached hydrogen atoms in the succinimidine reactant with chlorine. Preferably this excess is at least 2 X over the theoretically required amount.

The reaction is conducted in the presence of a strong acid such as hydrochloric or sulphuric acid, for example, said acid normally being employed on essentially an equimolar basis with respect to the hypochlorite. A moderate excess of either hypochlorite or acid does not interfere with the reaction.

The succinimidine reactant is normally employed in the form of a water soluble salt such, for example, as succinimide hydrochloride. This compound can readily be formed from succinamidine hydrochloride merely by adding the latter to water.

The reaction takes place in an aqueous medium to which the reactants can be added in any order. Preferably, however, an aqueous solution of the acid and of the succinimidine salt is slowly added to a stirred aqueous solution of the hypochlorite, thereby insuring the presence of the desired excess of hypochlorite at all times.

The reaction is preferably conducted over a water-immiscible organic solvent which takes up the N,N',N''-trichlorosuccinimidine compound as it is formed. This practice also has the advantage that the end point of the reaction can readily be detected, it coinciding with the clearing of the aqueous, supernatant fluid which can then be decanted off or otherwise removed. Organic solvents which can be employed for this purpose include those which are inert under the reaction conditions employed and which preferably have the density greater than 1. Representative solvents of this character include methylene chloride, chloroform, carbon tetrachloride, ether, ethylene dichloride and monofluorotrichloromethane, as well as the other Freons.

The reaction temperature employed is not critical and good results can be obtained at temperatures of from about 10° to 35° C. Ambient temperatures are preferred. Chlorination takes place rapidly and is usually complete within a period of 1 to 30 minutes after the reactants have been completely brought together, as evidenced either by the presence of a relatively clear supernatant aqueous layer or by the lack of any further precipitate formation in the aqueous reaction medium.

Once the organic phase has been recovered from the reaction mixture, the N,N',N''-trichlorosuccinimidine compound can be recovered from said phase by conventional methods known to those skilled in the art. Thus, the product can be dried by adding magnesium sulfate or sodium sulfate to the organic phase, then filtering the liquid and distilling the solvent therefrom, preferably at reduced pressures. The residual product can be purified by conventional methods including recrystallization, the use of a silica gel or other chromatographic column, or by distillation.

DESCRIPTION OF THE PREFERRED EMBODIMENTS

The following examples illustrate the invention but are not to be constructed as limiting:

Example 1

N,N',N''-trichlorosuccinimidine.—A solution was prepared by admixing 60.0 ml. of an aqueous solution of 5.25% sodium hypochlorite (0.042 mole) and 50 ml. of dilute HCl (0.042 mole). This solution was then stirred over 25 ml. of $CH_2Cl_2$ as 1 g. of succinamidine hydrochloride (0.0054 mole) was added in increments over a 10 minutes period, the reaction mixture being at approximately 25° C. After stirring for an additional 5 minutes, the $CH_2Cl_2$ phase was separated and the aqueous phase was twice extracted with $CH_2Cl_2$. The $CH_2Cl_2$ phase then was combined with the extracts. After drying this combined material with $MgSO_4$ and separating off the latter salt, the $CH_2Cl_2$ was distilled off under reduced pressure, leaving a white crystalline solid which was then purified by recrystallization from hot $CHCl_3$. There was recovered 0.92 g. of a white, plate-like material having a M.P. of 211–212° C. This product, which was insoluble in water and of good solubility in various organic solvents, was identified as N,N'-N''-trichlorosuccinimidine by infrared and elemental analysis, the results of the latter being as follows:

Calc'd for $C_4H_4N_3Cl_3$ (percent): C, 23.96; H, 2.00; N, 20.97; Cl, 53.07. Found (percent): C, 23.77; H, 1.85; N, 21.20; Cl, 53.21.

Example 2

The process of Example 1 is repeated, but with the succinamidine hydrochloride being combined with the dilute acid solution and the resulting solution then being slowly added to the stirred solution of sodium hypochlorite over $CH_2Cl_2$. Yields of from 80 to 90% can be obtained.

N,N'-N''-trichlorosuccinimidine is characterized by a high content of available chlorine and has utility as a chlorinating agent. Thus, chlorine is released as a solution of the compound is subjected to ultra-violet light. Said compound also has utility as a bactericide, among other applications. Thus, acetone solutions of N,N',N''-trichlorosuccinimidine, as well as acetone-water solutions containing as much as 88 percent by volume of water, give effective control of *E. coli* and *S. aureus* at concentrations containing as little as .0005 percent available chlorine.

As indicated above, the starting succinimidine compound which is chlorinated to form the compound hereof can be prepared merely by dissolving succinamidine in water. The latter compound, in turn, can be prepared by dissolving succinonitrile in ethanol followed by saturation of the resulting solution with hydrogen chloride gas to give corresponding iminoether which, on reaction with ammonia, yields the desired succinamidine.

I claim:
1. N,N',N''-trichlorosuccinimidine.

References Cited

Smith, Open-Chain Nitrogen Compounds (1965, pp. 181, 312–13.

Wagner et al., Synthetic Organic Chemistry (1953), pp. 103–04.

ALEX MAZEL, Primary Examiner

J. A. NARCAVAGE, Assistant Examiner

U.S. Cl. X.R.

8—101; 252—186, 188; 260—694; 424—274